(12) United States Patent
Alcazar et al.

(10) Patent No.: US 11,193,780 B2
(45) Date of Patent: Dec. 7, 2021

(54) VEHICLE SAFETY SYSTEM AND METHOD FOR PROVIDING A RECOMMENDED PATH

(71) Applicant: Continental Automotive Systems, Inc., Auburn Hills, MI (US)

(72) Inventors: Javier Alcazar, Troy, MI (US); Ganesh Adireddy, Bloomfield Hills, MI (US); Dominik Froehlich, Ferndale, MI (US); Ibro Muharemovic, Warren, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 147 days.

(21) Appl. No.: 16/135,534

(22) Filed: Sep. 19, 2018

(65) Prior Publication Data

US 2019/0120644 A1 Apr. 25, 2019

Related U.S. Application Data

(60) Provisional application No. 62/560,367, filed on Sep. 19, 2017.

(51) Int. Cl.
*G01C 21/20* (2006.01)
*G01C 21/34* (2006.01)
*G01C 21/36* (2006.01)

(52) U.S. Cl.
CPC ......... *G01C 21/3492* (2013.01); *G01C 21/20* (2013.01); *G01C 21/3691* (2013.01)

(58) Field of Classification Search
CPC ................................................ G01C 21/3492
See application file for complete search history.

(56) References Cited

U.S. PATENT DOCUMENTS

| 2,847,080 | A * | 8/1958 | Zworykin | G05D 1/0265 |
| | | | | 180/168 |
| 6,529,831 | B1 | 3/2003 | Smith et al. | |
| 9,146,121 | B2 * | 9/2015 | Husain | G08G 1/205 |
| 9,672,734 | B1 | 6/2017 | Ratnasingam | |
| 9,679,487 | B1 | 6/2017 | Hayward | |
| 9,805,601 | B1 | 10/2017 | Fields et al. | |
| 9,841,767 | B1 * | 12/2017 | Hayward | G05D 1/0285 |
| 9,869,560 | B2 * | 1/2018 | Gordon | B60W 30/00 |
| 9,988,047 | B2 * | 6/2018 | Johnson | B60W 10/184 |
| 10,284,317 | B1 * | 5/2019 | Sanchez | H04H 20/62 |
| 10,384,678 | B1 * | 8/2019 | Konrardy | G05D 1/0287 |
| 2005/0187701 | A1 * | 8/2005 | Baney | G08G 1/096716 |
| | | | | 701/117 |
| 2007/0132608 | A1 | 6/2007 | Votaw et al. | |

(Continued)

FOREIGN PATENT DOCUMENTS

KR 20170128684 A * 11/2017

OTHER PUBLICATIONS

Non-Final Office Action from U.S. Appl. No. 16/675,485, dated Mar. 3, 2021.

*Primary Examiner* — Shelley Chen

(57) ABSTRACT

A method of providing guidance in a host vehicle, including receiving a first broadcast signal transmitted by a first vehicle; and extracting vehicle data, a vehicle identifier, and a request from the first broadcast signal; responsive to the request, determining a recommended path for the host vehicle based upon the extracted vehicle data; and displaying or causing the displaying of the recommended path to the driver of the host vehicle.

21 Claims, 13 Drawing Sheets

(56) References Cited

U.S. PATENT DOCUMENTS

| | | | |
|---|---|---|---|
| 2009/0119014 A1* | 5/2009 | Caplan | G01S 19/51 |
| | | | 701/469 |
| 2014/0012494 A1* | 1/2014 | Cudak | G01C 21/3415 |
| | | | 701/412 |
| 2014/0188376 A1 | 7/2014 | Gordon | |
| 2014/0207377 A1 | 7/2014 | Gupta et al. | |
| 2015/0166062 A1* | 6/2015 | Johnson | B60W 10/20 |
| | | | 701/41 |
| 2016/0093213 A1* | 3/2016 | Rider | H04W 4/029 |
| | | | 701/537 |
| 2016/0107570 A1 | 4/2016 | Modarres et al. | |
| 2017/0030725 A1* | 2/2017 | Gordon | G01C 21/3492 |
| 2017/0052036 A1 | 2/2017 | Uno | |
| 2017/0076598 A1 | 3/2017 | Scofield et al. | |
| 2017/0219369 A1* | 8/2017 | Lei | G08G 1/096716 |
| 2017/0301234 A1* | 10/2017 | Park | H04R 27/00 |
| 2018/0061230 A1 | 3/2018 | Madigan et al. | |
| 2018/0233047 A1* | 8/2018 | Mandeville-Clarke | |
| | | | B60W 30/00 |
| 2018/0247540 A1* | 8/2018 | Hagawa | B60W 50/14 |
| 2018/0299279 A1* | 10/2018 | Brown | G01C 21/3415 |
| 2018/0335781 A1 | 11/2018 | Chase et al. | |
| 2019/0027032 A1 | 1/2019 | Arunachalam | |
| 2019/0056733 A1 | 2/2019 | Ferguson et al. | |
| 2019/0126942 A1 | 5/2019 | Goto et al. | |
| 2019/0316922 A1 | 10/2019 | Petersen et al. | |
| 2020/0182636 A1 | 6/2020 | Ningthoujam | |
| 2020/0207367 A1 | 7/2020 | Adireddy et al. | |

\* cited by examiner

VEHICLE SAFETY SYSTEM AND METHOD FOR PROVIDING A RECOMMENDED PATH

CROSS REFERENCE TO RELATED APPLICATION

The present application claims the benefit of U.S. provisional application 62/560,367, filed Sep. 19, 2017, entitled "Vehicle Safety System and Method for Providing a Recommended Path," the content of which is hereby incorporated by reference herein in its entirety.

FIELD OF INVENTION

The present invention generally relates to a safety system for a vehicle, and particularly to a system and method which utilize vehicle-to-vehicle communication for determining a recommended path for the vehicle and presenting the recommended path to the vehicle driver.

BACKGROUND

Vehicle-to-Vehicle (V2V) communication is known to allow for communication between vehicles over the air interface, for vehicles within a communication range of each other. It is further known for a vehicle having a global positioning system (GPS) to receive position information for presenting a vehicle driver with guidance to a preselected location. Such guidance, however, is generally directed to identifying the roads to take in order to reach the preselected location.

SUMMARY

Example embodiments are generally directed to providing to a vehicle driver a recommended path along a roadway. According to an example embodiment, there is disclosed a method for providing, to a vehicle driver, guidance in a host vehicle, including: receiving a first broadcast signal transmitted by a first vehicle; extracting vehicle data, a vehicle identifier, and a request from the first broadcast signal; responsive to the request, determining a recommended path for the host vehicle based upon the extracted vehicle data; and displaying or causing the displaying of the recommended path to the driver of the host vehicle.

Determining the recommended path may be also based upon vehicle data of the host vehicle.

The method may further include maintaining vehicle data of other vehicles that are within a communication range of the host vehicle, wherein determining the recommended path is also based upon the vehicle data of the other vehicles within the communication range of the host vehicle.

In an example embodiment, the host vehicle is traveling along a multi-lane roadway, and the recommended path includes a lane change along the multi-lane roadway.

The method may further include determining whether the vehicle identifier of the first vehicle corresponds to the request, and determining the recommended path is responsive to an affirmative determination that the vehicle identifier of the first vehicle corresponds to the request. The vehicle identifier may be an identifier for at least one of an emergency medical services vehicle and a law enforcement vehicle. The vehicle identifier may alternatively be an identifier for a disabled vehicle.

In one aspect, the host vehicle is traveling in a lane along a roadway, the first vehicle is a motorcycle traveling in the lane and the recommended path includes moving along one side of the lane to allow the motorcycle to pass the host vehicle while in the other side of the lane.

In another aspect, the method includes determining that the recommended path is no longer effective and in response ceasing or causing the ceasing of the displaying of the recommended path to the driver of the host vehicle.

The method may include broadcasting the recommended path to vehicles that are within a communication range of the host vehicle.

The method may include determining whether the determined recommended path is different from a current path of the host vehicle, wherein displaying or causing the displaying of the recommended path is responsive to an affirmative determination that the determined recommended path is different from a current path of the host vehicle.

In another example embodiment, a program code product for guiding a host vehicle is disclosed, the program code product being stored in non-transitory memory and including instructions which, when executed by a processor, cause the processor to receive a first broadcast signal transmitted by a first vehicle; extract vehicle data, a vehicle identifier, and a request from the first broadcast signal; responsive to the request, determine a recommended path for the host vehicle based upon the extracted vehicle data; and cause the recommended path to be displayed to the driver of the host vehicle.

The program code product may include instructions for maintaining vehicle data of other vehicles that are in a communication range of the host vehicle, wherein the recommended path is determined based upon the maintained vehicle data of the other vehicles within the communication range of the host vehicle.

The program code product may further include instructions for determining whether the vehicle identifier of the first vehicle corresponds to the request, and the instructions for determining the recommended path determines the recommended path based upon an affirmative determination that the vehicle identifier of the first vehicle corresponds to the request.

The program code product may further include instructions for determining whether the recommended path is no longer effective, and in response ceasing or causing the ceasing of the displaying of the recommended path to the driver of the host vehicle.

The program code product may also further include instructions for broadcasting the recommended path to vehicles that are within a communication range of the host vehicle.

The program code product may also include instructions for determining whether the recommended path is different from a current path of the host vehicle, and the instructions for displaying or causing the displaying of the recommended path is based in part upon the determination that the recommended path is different from the current path.

In one aspect, the recommended path includes one of a lane change from a lane in which the host vehicle is travelling, and movement to one lateral side of a lane in which the host vehicle is travelling.

In another example embodiment, a vehicle guidance system is configured for use in a host vehicle, including a transceiver having a transmitter and a receiver for receiving vehicle signals, and a processor and memory coupled to the processor, the processor communicatively coupled to the transceiver, and the memory having stored therein a software program having instructions which, when executed by the processor, configure the processor to: receive from the receiver broadcast signal information contained in a broadcast signal from a first vehicle; extract vehicle data, a vehicle identifier, and a request from the broadcast signal information; responsive to the request, determine a recommended path for the host vehicle based upon the extracted vehicle data; and cause the recommended path to be displayed to a driver of the host vehicle.

The processor is configured to determine the recommended path for the host vehicle based upon data corresponding to other vehicles that are within a communication range of the host vehicle. The processor may be further configured to confirm that the request is of a type that is allowed to be made by the first vehicle, and the recommended path is determined by the processor only upon an affirmative confirmation.

BRIEF DESCRIPTION OF THE DRAWINGS

Aspects of the invention will be explained in detail below with reference to exemplary embodiments in conjunction with the drawings, in which.

DETAILED DESCRIPTION

The following description of the example embodiment(s) is merely exemplary in nature and is in no way intended to limit the invention, its application, or uses.

The example embodiments presented herein are generally directed to a safety system disposed in a vehicle, referred to as a host vehicle, which provides a recommended, safer path for the vehicle to take in response to various traffic events or scenarios. Specifically, the safety system relies upon vehicle-to-vehicle (hereinafter "V2V") communication for a vehicle to detect any of a number of traffic events and to determine and present to the vehicle's driver a safer, recommended path for the vehicle. In this way, the safety system may form at least part of a vehicle guidance system for a vehicle.

Figure 1:
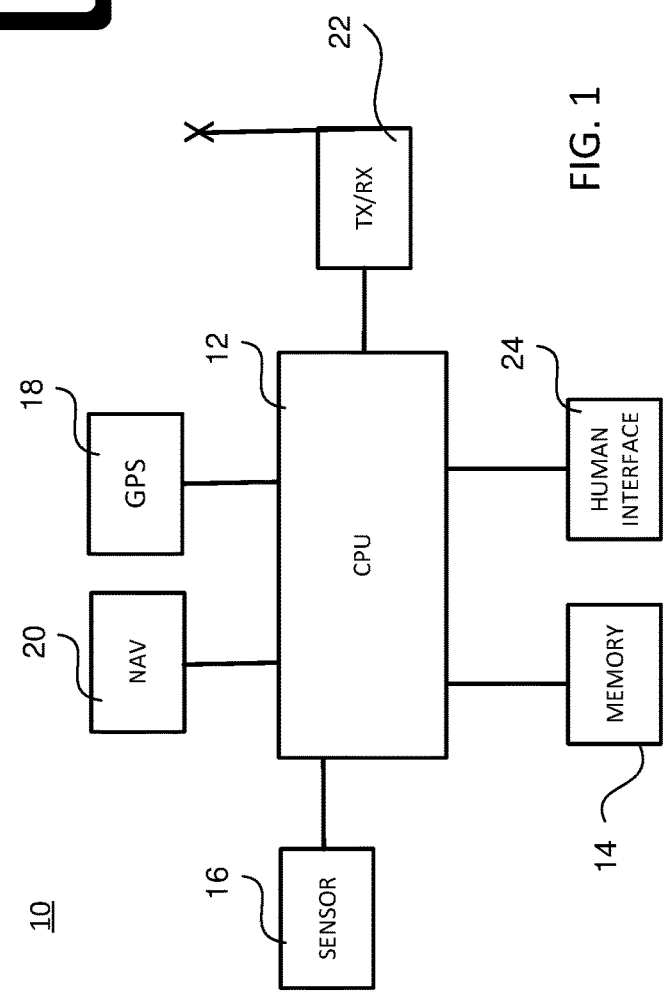
FIG. 1 is a block diagram of a vehicle safety system according to an example embodiment.

FIG. 1 illustrates a block diagram of a vehicle safety system 10 according to an example embodiment. Vehicle safety system 10 is configured to be installed in a motor vehicle. The system includes a central processing unit (CPU) 12 which includes a processor or processing device for executing program code instructions stored in nonvolatile memory 14. Vehicle safety system 10 may further include a sensor network 16 having sensors disposed around the vehicle including a plurality of sensors which detect various vehicle dynamic information of the vehicle. For instance, the sensors of sensor network 16 may measure the speed (lateral and longitudinal) and acceleration (lateral and longitudinal) of the vehicle. Vehicle safety system 10 may also include a global positioning system (GPS) 18 coupled to CPU 12, for determining the position and orientation of the vehicle. A navigation system 20 is coupled to CPU 12 for providing map related information to CPU 12. A transceiver 22, having a transmitter and receiver, is coupled to CPU 12 for use in communicating over the air interface. In an example embodiment, vehicle safety system 10 may utilize the Dedicated Short Range Communication (DSRC) protocol in communicating over the air interface. It is understood, however, that vehicle safety system 10 may utilize other known communication protocols or protocols which have not yet been developed for communicating over the air interface. Though not shown in FIG. 1, transceiver 22 may be coupled to GPS 18 for communicating position and orientation information with CPU 12. Further, vehicle safety system 10 may include a human interface 24, coupled to CPU 12, for communicating information between vehicle safety system 10 and a driver of the host vehicle. Human interface 24 may be and/or include a graphical user interface (GUI) for interfacing with the vehicle driver.

Figure 2:
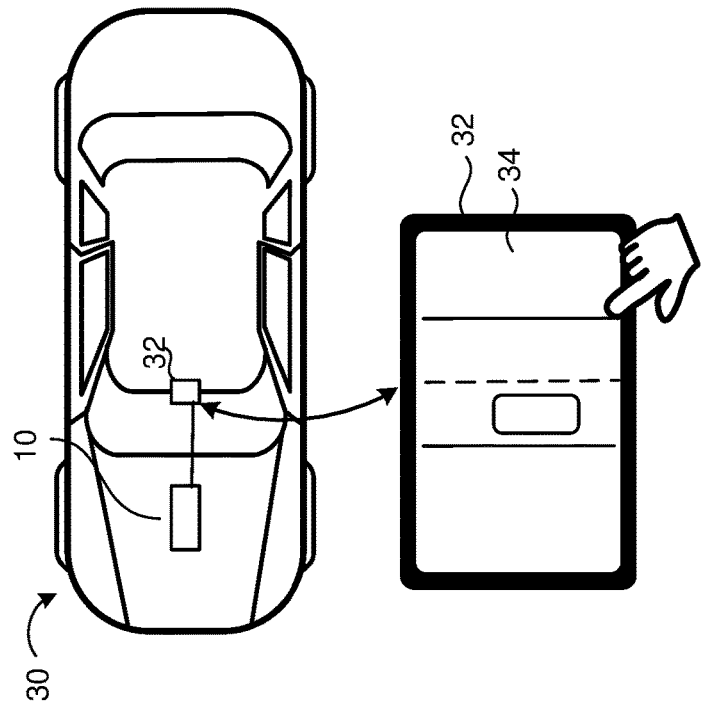
FIG. 2 is a top view of a host vehicle having therein the vehicle safety system of FIG. 1.

FIG. 2 illustrates a vehicle 30 in which vehicle safety system 10 is installed. With vehicle 30 having vehicle safety system 10 installed therein, vehicle 30 is considered a host vehicle. Though not shown in FIG. 2, it is understood that sensors of sensor network 16 may be disposed in various locations within and/or around vehicle 30 for detecting vehicle dynamic information relating to vehicle 30. Human interface 24 may include hardware, such as a touchscreen display 32 installed in or on the dashboard of vehicle 30. The human interface 24 also includes software for presenting information as an image 34, moving or still, to the vehicle driver on touchscreen display 32, and for receiving information entered manually by the vehicle driver using touchscreen display 32. In an example embodiment in which vehicle 30 is traveling along a roadway, human interface 24 may display image 34 as a computer generated image depicting vehicle 30 traveling along an image depicting the roadway. In an alternative embodiment, sensor network 16 includes one or more cameras disposed around vehicle 30, and image 34 may include a combination of a video segment captured from the one or more cameras and a computer generated image. In this embodiment, the video segment may be in real time or near real time.

It is understood that the particular structure and/or implementation of each of sensor network 16, GPS 18, navigation system 20 and transceiver 22 is well known such that a detailed description of each will not be provided herein for reasons of simplicity.

In general terms, vehicle safety system 10 is configured to identify, using V2V communication, a traffic event or scenario along a roadway, determine a recommended path which provides a safer travel path for the vehicle relative to the current travel path thereof, and display the recommended path to the vehicle driver. Vehicle safety system 10 is configured to determine and display recommended paths for numerous different traffic events or scenarios. The operation of vehicle safety system 10 will be described with respect to three different traffic events/scenarios.

Figure 3:
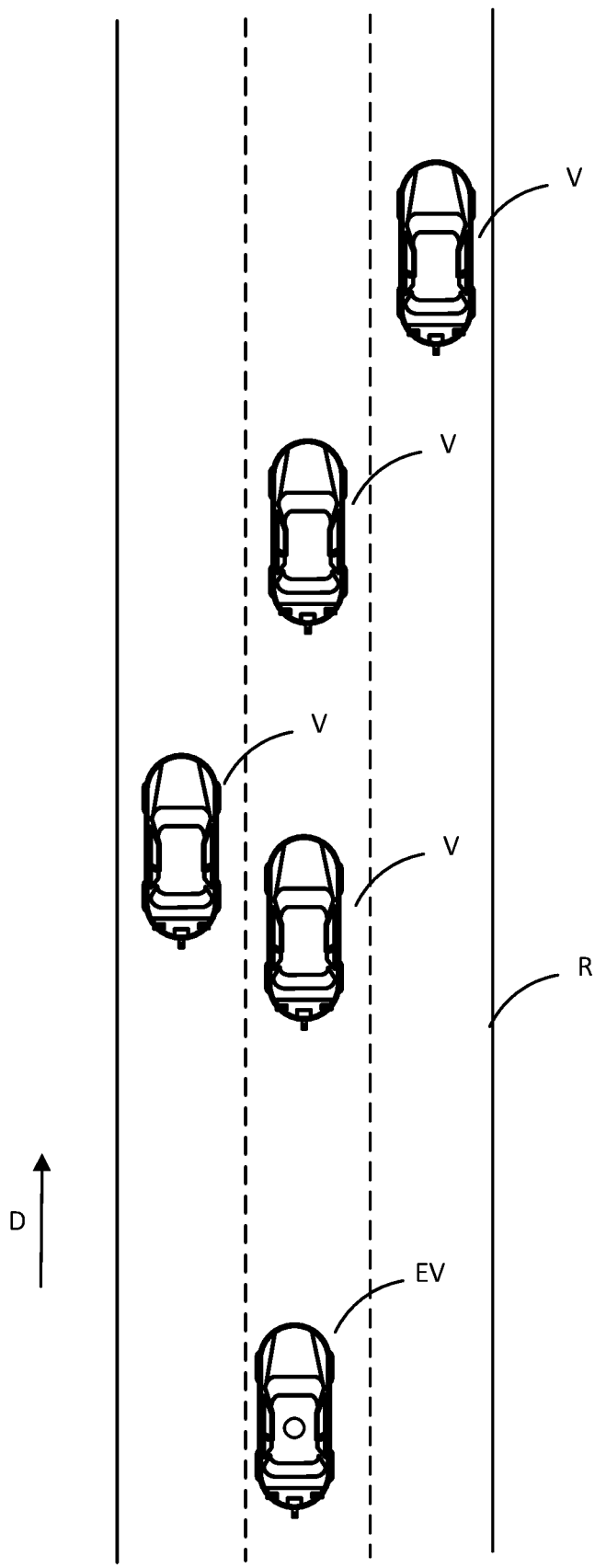
FIG. 3 is an illustration depicting a first traffic scenario addressed by the vehicle safety system of FIG. 1.
Figure 4:
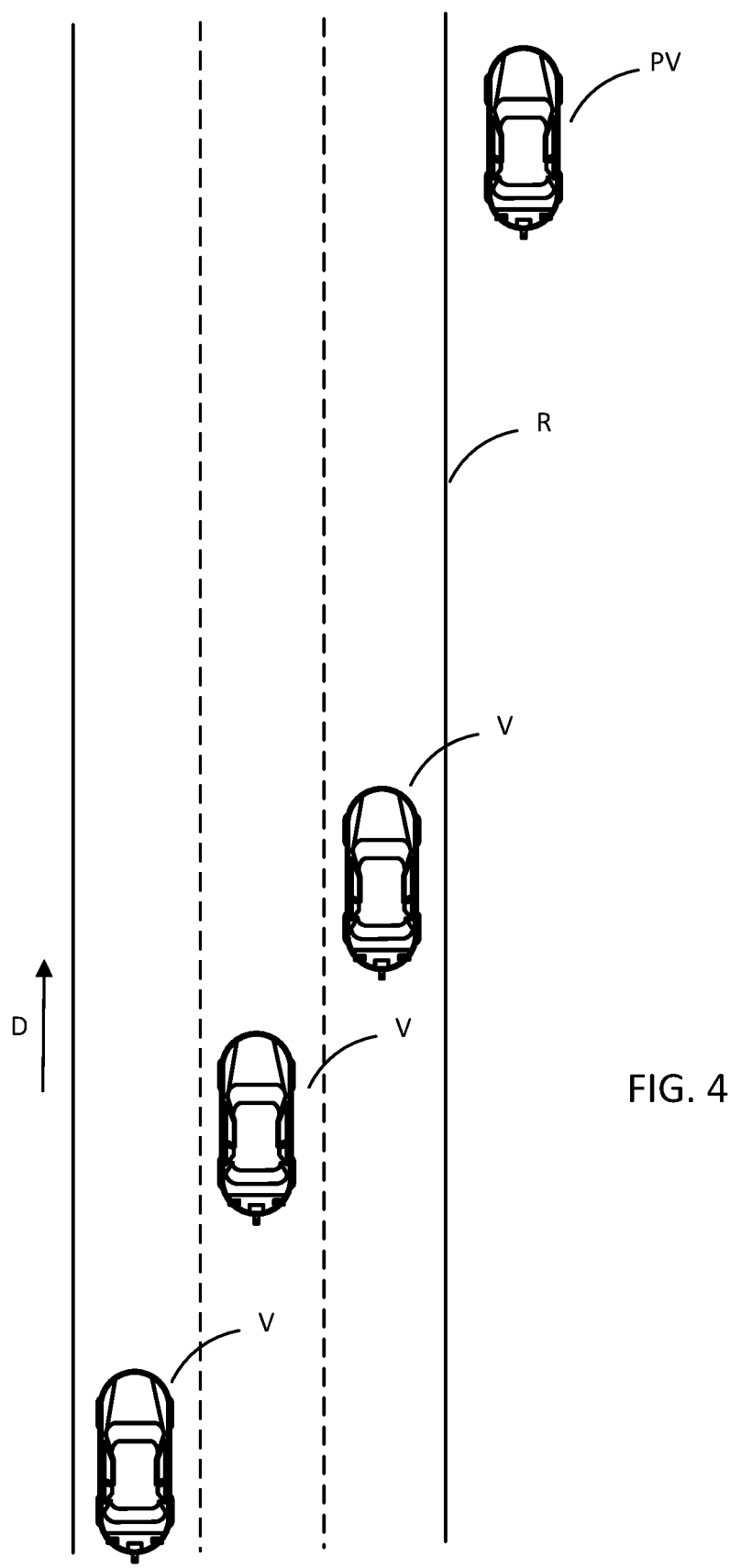
FIG. 4 is an illustration depicting a second traffic scenario addressed by the vehicle safety system of FIG. 1.
Figure 5:
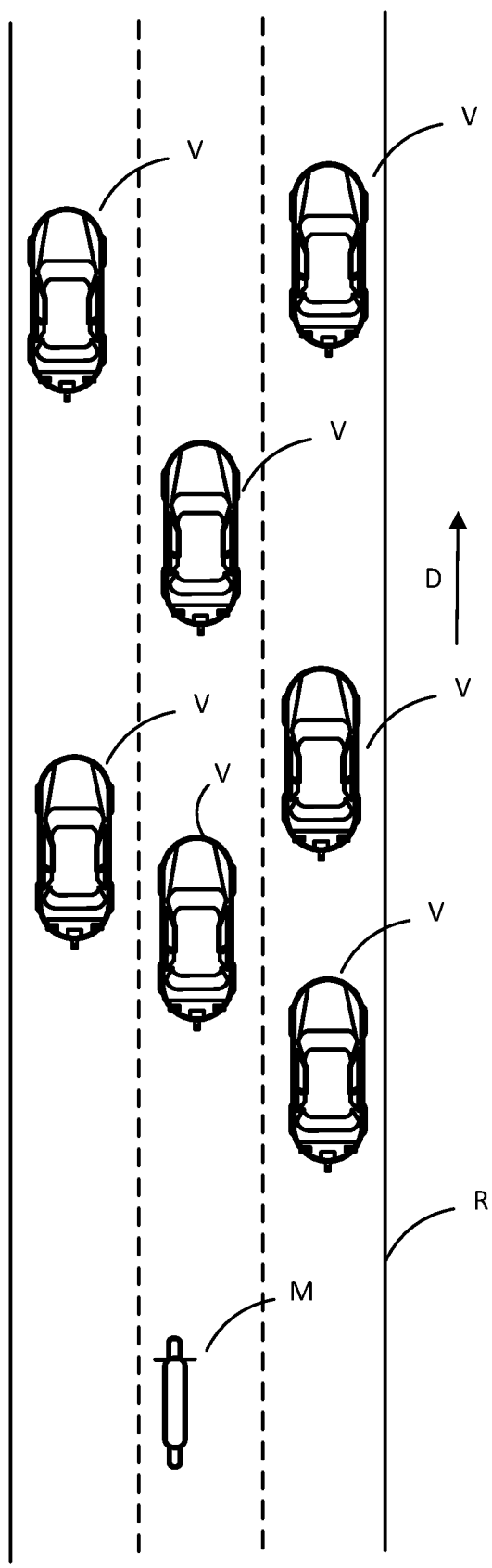
FIG. 5 is an illustration depicting a third traffic scenario addressed by the vehicle safety system of FIG. 1.

A first traffic event which vehicle safety system 10 is configured to address is an emergency vehicle (law enforcement, EMS, etc.) attempting to expeditiously reach a desired destination. With reference to FIG. 3, emergency vehicle EV is shown traveling along a multi-lane roadway R with a number of other vehicles V traveling ahead of emergency vehicle EV, all in direction D. FIG. 4 illustrates a second traffic event in which a vehicle PV is pulled over and parked along the side of multi-lane roadway R as other vehicles V travel along the roadway R in direction D. The parked vehicle PV may be, for example, a disabled vehicle or a law enforcement vehicle. A third traffic event is illustrated in FIG. 5 in which a motorcycle M attempts to pass through a group of stopped and/or slowly moving vehicles V, moving (or attempting to move) in direction D on roadway R. Vehicles V may be vehicles in a "stop and go" traffic jam. Vehicle safety system 10 is configured to detect these and other traffic events and present a safer recommended path for one or more vehicles forming at least part of the traffic event.

Figure 6:
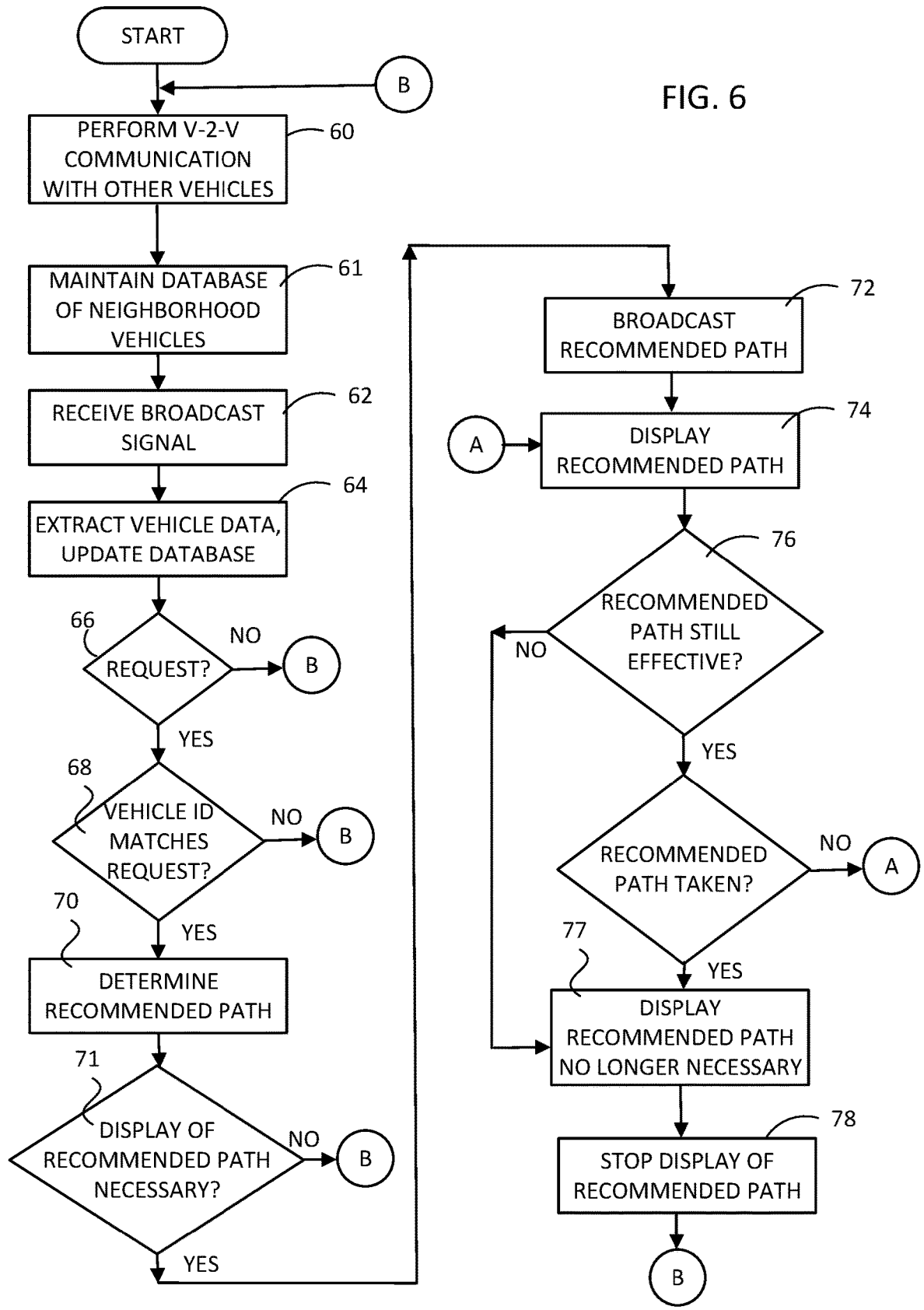
FIG. 6 is a flowchart depicting an operation of the vehicle safety system of FIG. 1, according to an example embodiment.

FIG. 6 is a flowchart describing the operation of vehicle traffic system 10 according to an example embodiment. During operation of a vehicle 30 in which vehicle safety system 10 is installed, vehicle safety system 10 performs various V2V communication with other vehicles in its communication range at 60, and maintains vehicle data in memory 14 for each such vehicle at 61. This V2V communication may be communication that occurs during normal operation of vehicles having V2V communication capabilities. The vehicle data maintained in memory 14 for each such vehicle may include vehicle dynamic information, such as the position, orientation, velocity (lateral and longitudinal) and acceleration (lateral and longitudinal) of the vehicle. Next, vehicle 30 receives at 62 a broadcast signal from another vehicle in the communication range of vehicle 30. The broadcast signal may include, among other things, dynamic data of the broadcasting vehicle, identification data and a request. The dynamic data may be the same as the vehicle dynamic data mentioned above which is maintained in memory 14. The identification data may identify the broadcasting vehicle by vehicle type to which a number of vehicles belong, and/or by the particular vehicle.

In the first traffic event (FIG. 3), the identification data includes data which identifies the broadcasting vehicle as an emergency vehicle, and the request is for vehicles ahead of the emergency vehicle to yield so that the emergency vehicle may arrive at its desired destination more quickly. In the second traffic event (FIG. 4), the identification data, for example, identifies the pulled-over and parked vehicle as an emergency vehicle or a disabled vehicle, and the request is for vehicles to move from the lane closest to the parked vehicle. In the third traffic event (FIG. 5), the identification data identifies the broadcasting vehicle as a motorcycle and the request is for the stopped or slow moving vehicles ahead of, and in the same lane as, the motorcycle to move to one side of the lane so that the motorcycle may pass such vehicles without colliding therewith, such as colliding with the side mirrors of the vehicles.

The request is directed to one, some or all vehicles in the communication range of the broadcasting vehicle. It is understood that the broadcast signal transmitted by the broadcasting vehicle includes other information and follows a format for the particular communication protocol utilized by vehicles which utilize V2V communication. Once the broadcast signal is received by vehicle 30 (and other vehicles in the communication range of the broadcasting vehicle), at 64 vehicle safety system 10 of vehicle 30 extracts the segments of the broadcast signal described above and updates the vehicle data maintained in memory 14.

The vehicle safety system 10 of vehicle 30 next determines at 66 whether the received broadcast signal includes a request, because not every V2V signal received by vehicle 30 includes a request. Control returns to act 60 if the received broadcast signal does not include a request. Upon an affirmative determination that the received broadcast signal includes a request, vehicle safety system 10 determines at 68 whether the request is consistent with or otherwise matches the identification data of the received broadcast signal. In particular, vehicle safety system 10 determines whether or not the request of the received broadcast signal is of the type that is allowed to be made by a vehicle having the identification data in the broadcast signal. In the first traffic event (FIG. 3), vehicle safety system 10 affirmatively determines whether the request for other vehicles to yield matches the identification data identifying the broadcasting vehicle as an emergency vehicle. In the second traffic event (FIG. 4), vehicle safety system 10 affirmatively determines whether the request for vehicles to move from the lane nearest the broadcasting vehicle matches the identification data identifying the pulled-over vehicle to be one of an emergency vehicle and a disabled vehicle. In the third traffic event (FIG. 5), vehicle safety system 10 affirmatively determines whether the request for vehicles in the same lane as the broadcasting vehicle matches the identification data identifying the broadcasting vehicle as a motorcycle. If the request does not match and/or is otherwise inconsistent with the identification data, then the request is ignored (and/or a reply is transmitted to the broadcasting vehicle that the request is denied) and control returns to step 60.

In the event the request of the received broadcast signal matches and/or is consistent with the identification data therein, vehicle safety system 10 determines at 70 a recommended path for vehicle 30. The recommended path is determined to be the path which contributes to the safest (or nearly the safest or one of the safest) outcome for vehicle 30, the broadcasting vehicle as well as the other vehicles within the communication range of vehicle 30 and/or the broadcasting vehicle. Alternatively or additionally, the recommended path is determined to be a path which responds to the request in the received broadcast signal and helps to better avoid a potentially unsafe traffic event from happening.

In an example embodiment, vehicle safety system 10 determines the recommended path based upon the particular request of the received broadcast signal, and the dynamic data of vehicle 30 and the broadcasting vehicle. For example, the position, orientation, speed and acceleration/deceleration (both longitudinal and lateral) of vehicle 30 and the broadcasting vehicle are utilized. In addition, vehicle safety system 10 determines the recommended path based upon the dynamic data of other vehicles within the communication window of vehicle 30 stored in memory 14. Determining the recommended path is also based upon map data pertaining to the roadway R from navigation system 20. Vehicle safety system 10 may take into consideration the amount of variance each potential recommended path requires from the current path of vehicle 30 in determining the recommended path therefrom. Further, the recommended path may be determined based upon the recommended path which other vehicles V in the communication range of vehicle 30 may have already determined and communicated to vehicle 30 and other vehicles in the communication range. In an example embodiment, there may be two or more paths which vehicle safety system 10 determines to be the safest or near safest for avoiding a potentially unsafe traffic event, and vehicle safety system 10 arbitrarily selects one such path as the recommended path.

In an example embodiment, vehicle safety system 10, and particularly CPU 12, may determine the recommended path by first identifying possible paths, such as all possible paths, for vehicle 30. The possible paths may be weighted at least based upon the vehicle information discussed above. With each possible path properly weighted, CPU 12 may select one of the weighted, possible paths as the recommended path.

Figure 7:
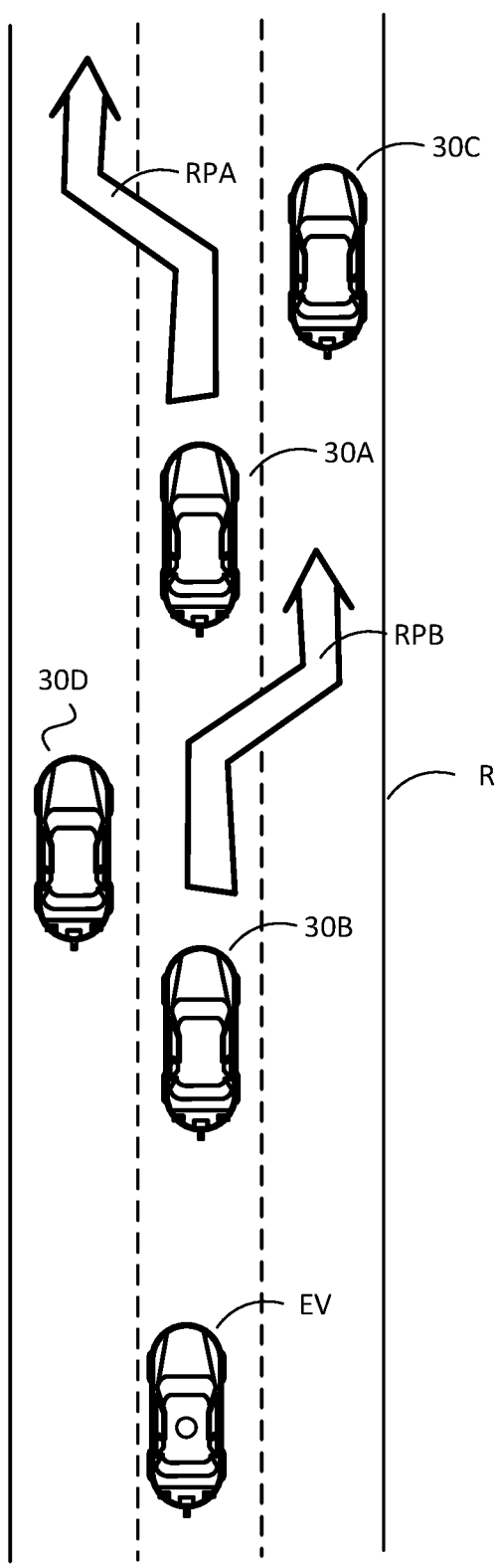
FIG. 7 illustrates recommended paths determined by the vehicle safety system in two host vehicles, in response to the first traffic scenario of FIG. 3, according to an example embodiment.

With respect to the first traffic event, illustrated again in FIG. 7, the vehicle safety system 10 appearing in vehicle 30A may determine that the recommended path for vehicle 30A is path RPA, which calls for vehicle 30A to change from the middle lane of roadway R to the left lane thereof. The vehicle safety system 10 appearing in vehicle 30B may determine that the recommended path for vehicle 30B is RPB, requiring vehicle 30B to change from the middle lane of roadway R to the right lane thereof. The vehicle safety systems 10 in vehicles 30C and 30D may determine that the recommended path is for each vehicle 30C and 30D to remain in its present lane. The recommended paths, if taken by vehicles 30A-30D, result in the middle lane of roadway R opening for emergency vehicle EV.

Figure 8:
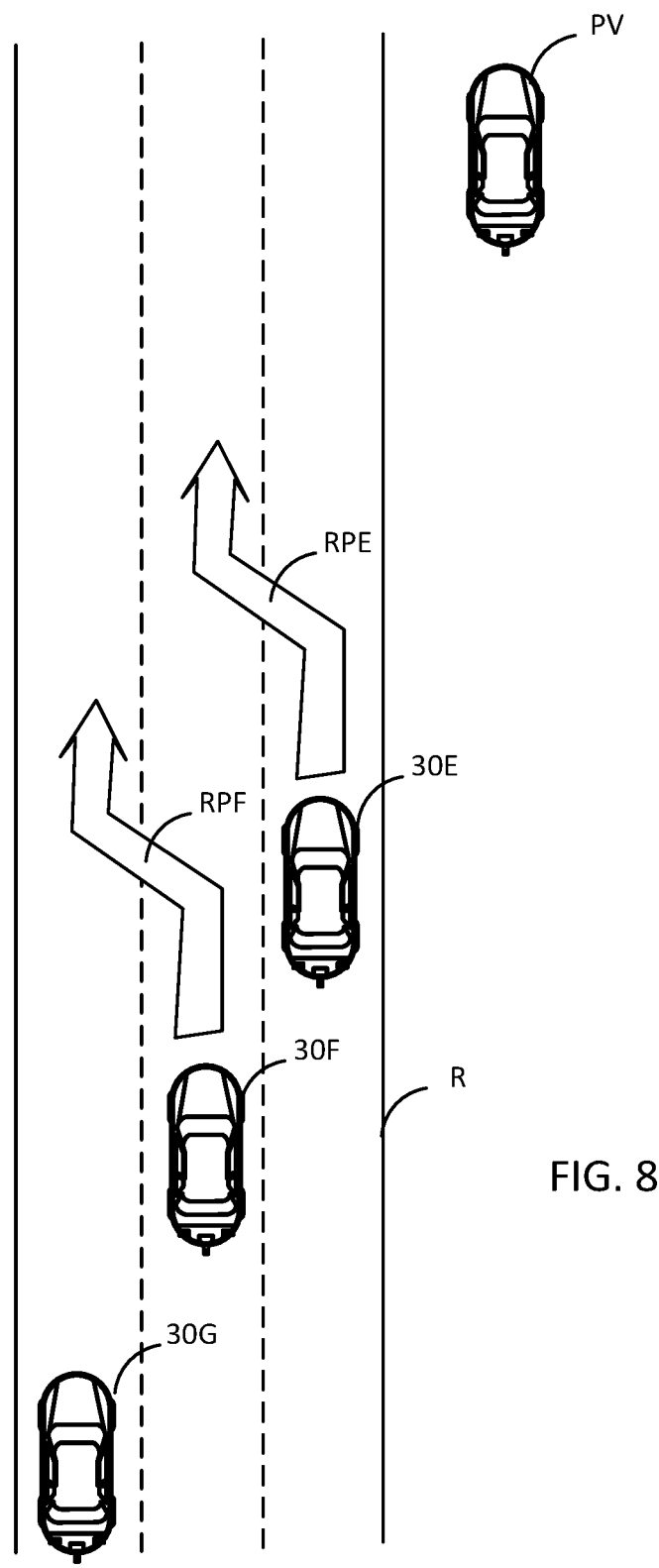
FIG. 8 illustrates recommended paths determined by the vehicle safety system in two host vehicles, in response to the second traffic scenario of FIG. 4, according to an example embodiment.

With respect to the second traffic event, illustrated again in FIG. 8, the vehicle safety system 10 appearing in vehicle 30E may determine that the recommended path for vehicle 30E is path RPE, which would require vehicle 30E to change lanes from the right lane of roadway R to the center lane thereof. In addition, the vehicle safety system 10 appearing in vehicle 30F may determine that the recommended path for vehicle 30F is path RPF, which would require vehicle 30F to change lanes from the center lane of roadway R to the left lane thereof. The vehicle safety system 10 in vehicle 30G may determine that the recommended path therefor is for vehicle 30G to remain in its present lane. These recommended paths, if taken by vehicles 30E-30G, result in the right lane of roadway R being clear near parked vehicle PV.

Figure 9:
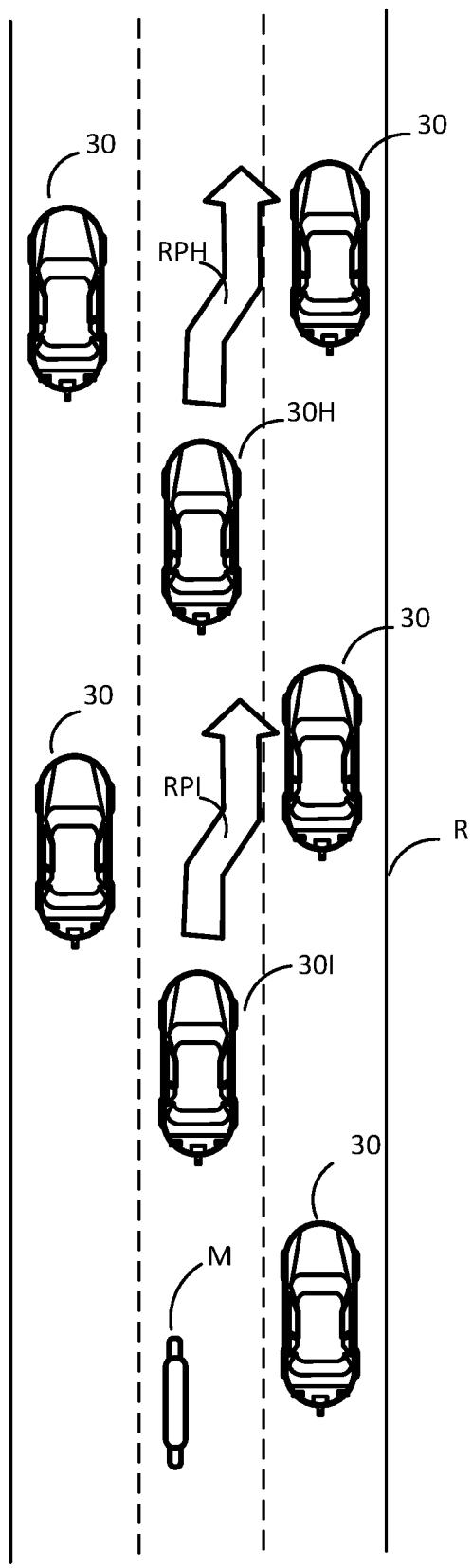
FIG. 9 illustrates recommended paths determined by the vehicle safety system in two host vehicles, in response to the third traffic scenario of FIG. 5, according to an example embodiment.

With respect to the third traffic event, illustrated again in FIG. 9, the vehicle safety system 10 appearing in vehicle 30H may determine that the recommended path for vehicle 30H is path RPH, which would require vehicle 30H to move to the right side of the center lane of roadway R. In addition, the vehicle safety system 10 appearing in vehicle 30I may determine that the recommended path for vehicle 30I is path RPI, which would require vehicle 30I to move to the right side of the center lane of roadway R. The vehicle safety systems 10 in each of the other vehicles 30 in FIG. 9 may determine that the recommended path therefor is for corresponding vehicle 30 to remain in its present lane. In other words, the recommended path for each of the other vehicles 30 in FIG. 9 is no different than the vehicle's current path. These recommended paths, if taken by slowly moving vehicles 30H and 30I, result in the left side of the center lane of roadway R being clear for motorcycle M to pass vehicles 30H and 30I.

Referring again to FIG. 6, it is understood that following determining the recommended path at step 70, CPU 12 may determine whether displaying the recommended path for vehicle 30 is necessary at 71 and if it is determined that displaying the recommended path for vehicle 30 is not necessary, then return operation to step 60. For example, with reference to the third traffic event shown in FIG. 9, the vehicle safety system 10 in vehicles 30 which are not in the same lane as motorcycle M may determine that displaying its determined recommended path is not needed for responding to the request from motorcycle M, and return to step 60 in FIG. 6. Specifically, if, for example, a recommended path determined by vehicle safety system 10 is not different from the current path of the corresponding vehicle 30, vehicle safety system 10 may determine that it is not necessary to display the recommended path so as to avoid distracting the vehicle driver.

Once a recommended path is determined in step 70 and the display of such path is determined to be necessary in step 71, vehicle safety system 10 may optionally broadcast at 72 the recommended path to other vehicles within the communication range of vehicle 30. Broadcasting the recommended path may, for example, allow the vehicle safety system 10 in other vehicles within the communication range to use the broadcasted recommended path in determining the recommended path for its vehicle. Generally, broadcasting the recommended path may provide information as to a possible future event which a vehicle may use for controlling or assisting in the control of a vehicle which received the broadcasted recommended path.

Following the determination of the recommended path in step 70, vehicle safety system 10 of vehicle 30, via human interface 24, communicates the recommended path to the driver of vehicle 30 at 74. In an example embodiment, vehicle safety system 10 visually communicates the recommended path to the driver, such as graphically displaying the recommended path. For example, vehicle safety system 10 graphically depicts on touchscreen 32 an image and/or series of images (e.g., a video, animated or otherwise) of the recommended path determined in step 70. The displayed image/video, for example, includes a depiction of a pertinent segment of roadway R and the vehicle 30 thereon. The recommended path may be depicted as an arrow or other symbol which quickly and easily informs the driver of vehicle 30 of the existence of the recommended path and the necessary action needing to be undertaken by the driver if the driver decides to take the recommended path.

Figure 10:
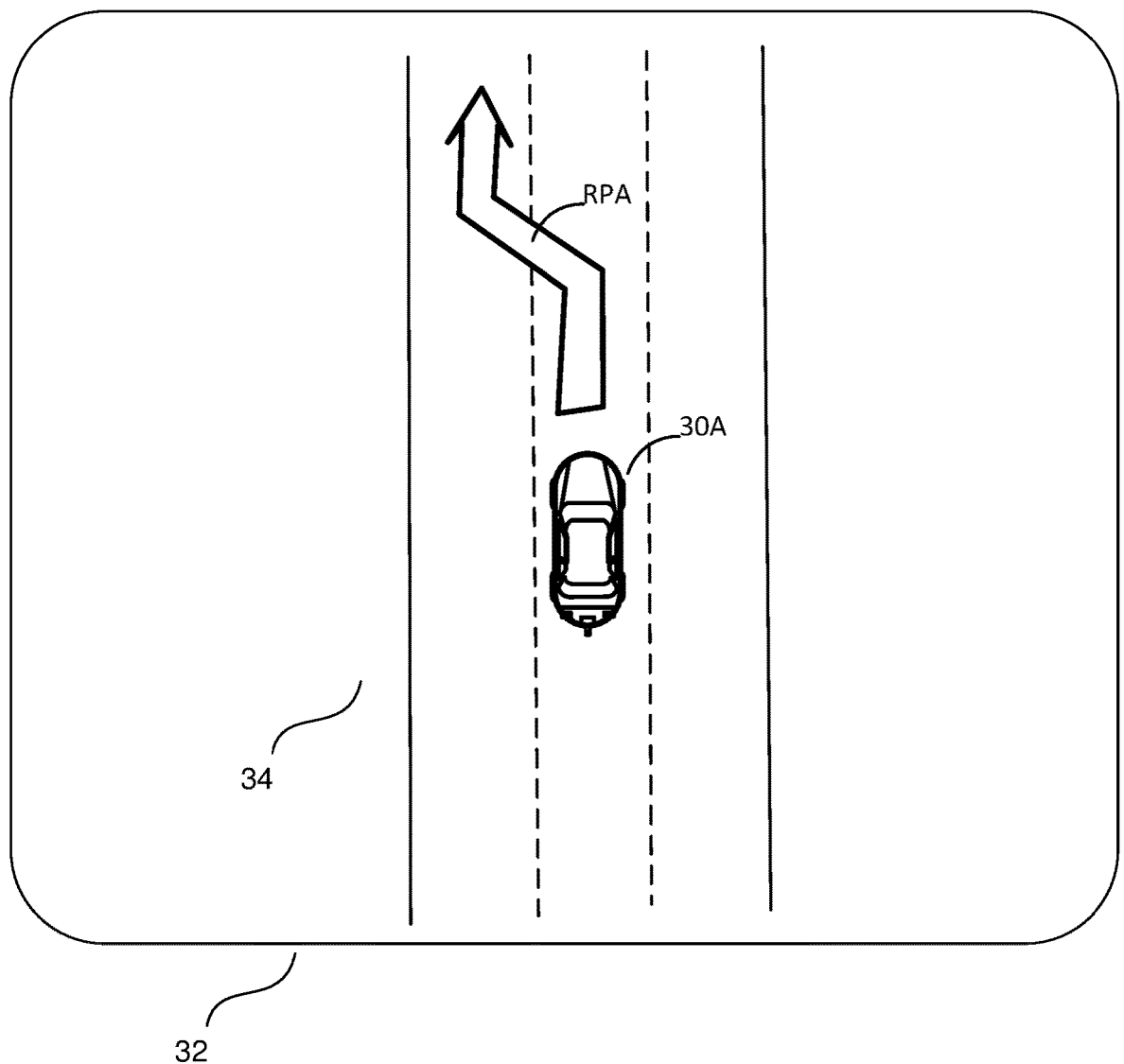
FIG. 10 illustrates the display of the recommended path determined by the vehicle safety system of a first vehicle, in response to the first traffic scenario of FIG. 3.
Figure 11:
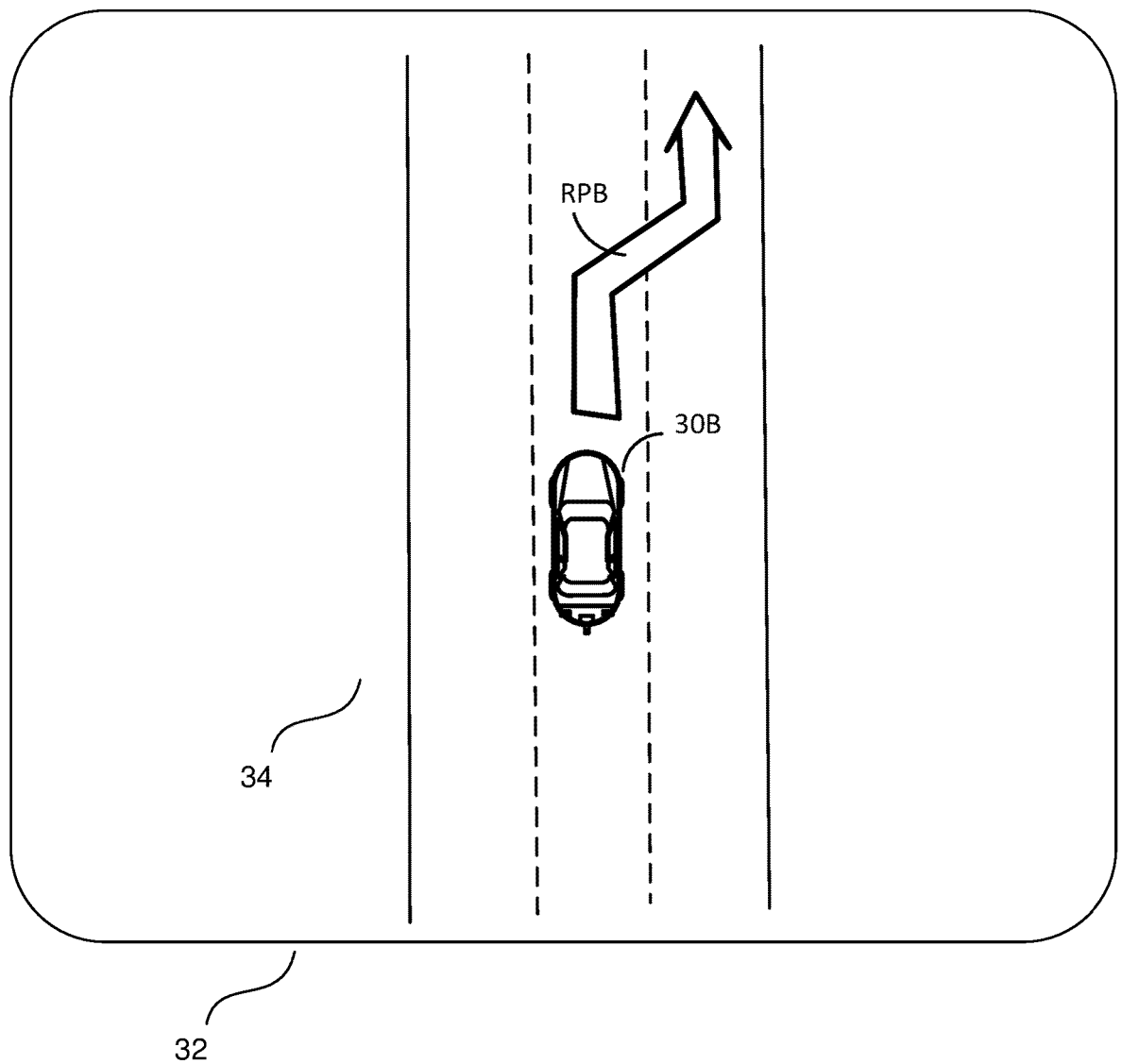
FIG. 11 illustrates the display of the recommended path determined by the vehicle safety system of a second vehicle, in response to the first traffic scenario of FIG. 3.

With respect to the first traffic event of FIGS. 3 and 7, vehicle safety system 10 of vehicle 30A displays on touchscreen display 32 an image(s) 34 including depictions of roadway R, vehicle 30A and recommended path RPA, as shown in FIG. 10. The vehicle safety system 10 of vehicle 30B displays image 34 including depictions of roadway R, vehicle 30B and recommended path RPB, as shown in FIG. 11. For each of the other vehicles 30D and 30C of FIG. 7, the recommended path determined by the corresponding vehicle safety system 10 does not diverge from the vehicle's current path and so the system 10 determines that displaying the path is unnecessary in order to avoid distracting the vehicle driver.

Figure 12:
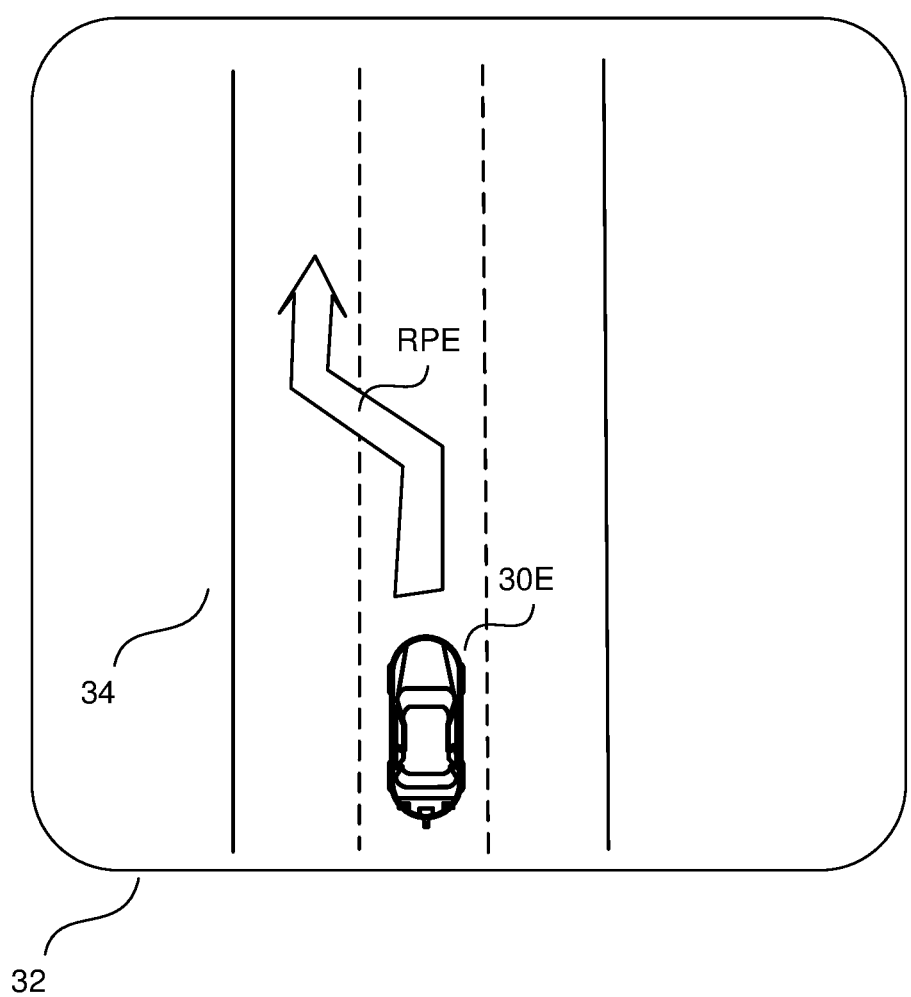
FIG. 12 illustrates the display of the recommended path determined by the vehicle safety system of a first vehicle, in response to the second traffic scenario of FIG. 4.
Figure 13:
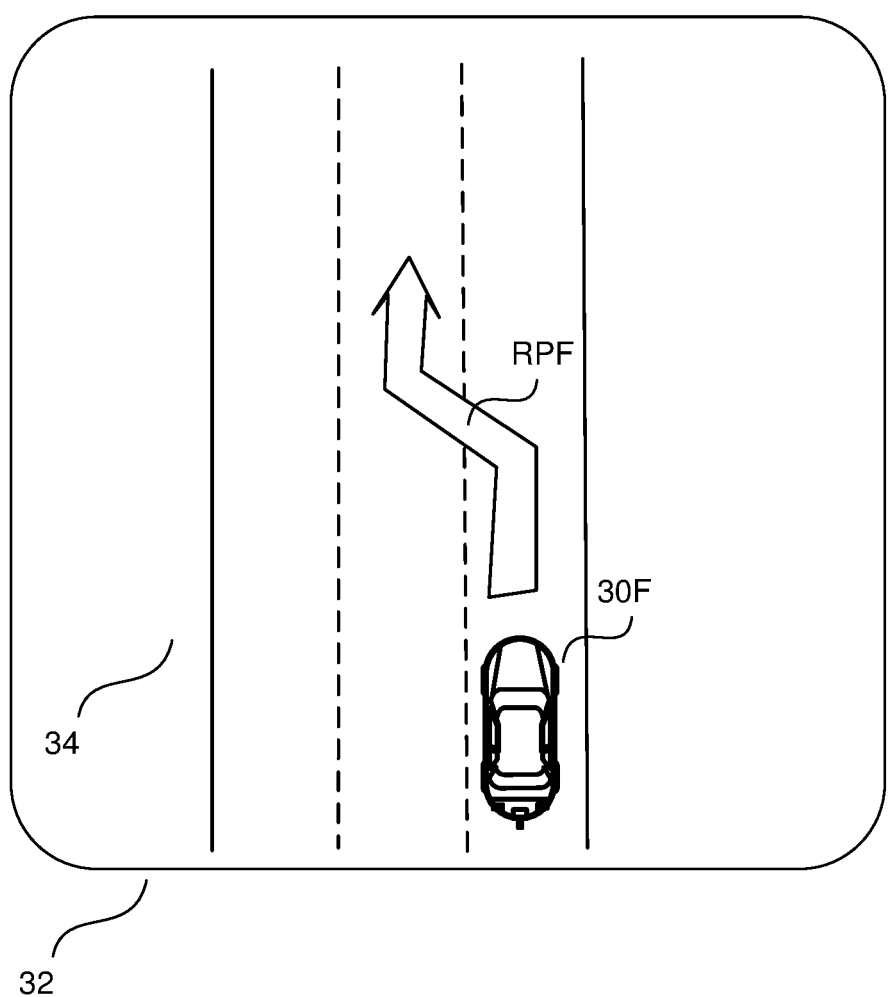
FIG. 13 illustrates the display of the recommended path determined by the vehicle safety system of a second vehicle, in response to the second traffic scenario of FIG. 4.

With respect to the second traffic event of FIGS. 4 and 8, vehicle safety system 10 of vehicle 30E may display on touchscreen display 32 an image(s) 34 including depictions of roadway R, vehicle 30E and recommended path RPE, as shown in FIG. 12. The vehicle safety system 10 of vehicle 30F may display on its touchscreen display 32 an image(s) 34 including depictions of roadway R, vehicle 30F and recommended path RPF, as shown in FIG. 13. For vehicle 30G of FIG. 8, the recommended path determined by the corresponding vehicle safety system 10 does not diverge from the current path of vehicle 30G and so displaying the path is determined to be unnecessary in order to avoid distracting the vehicle driver.

Figure 14:
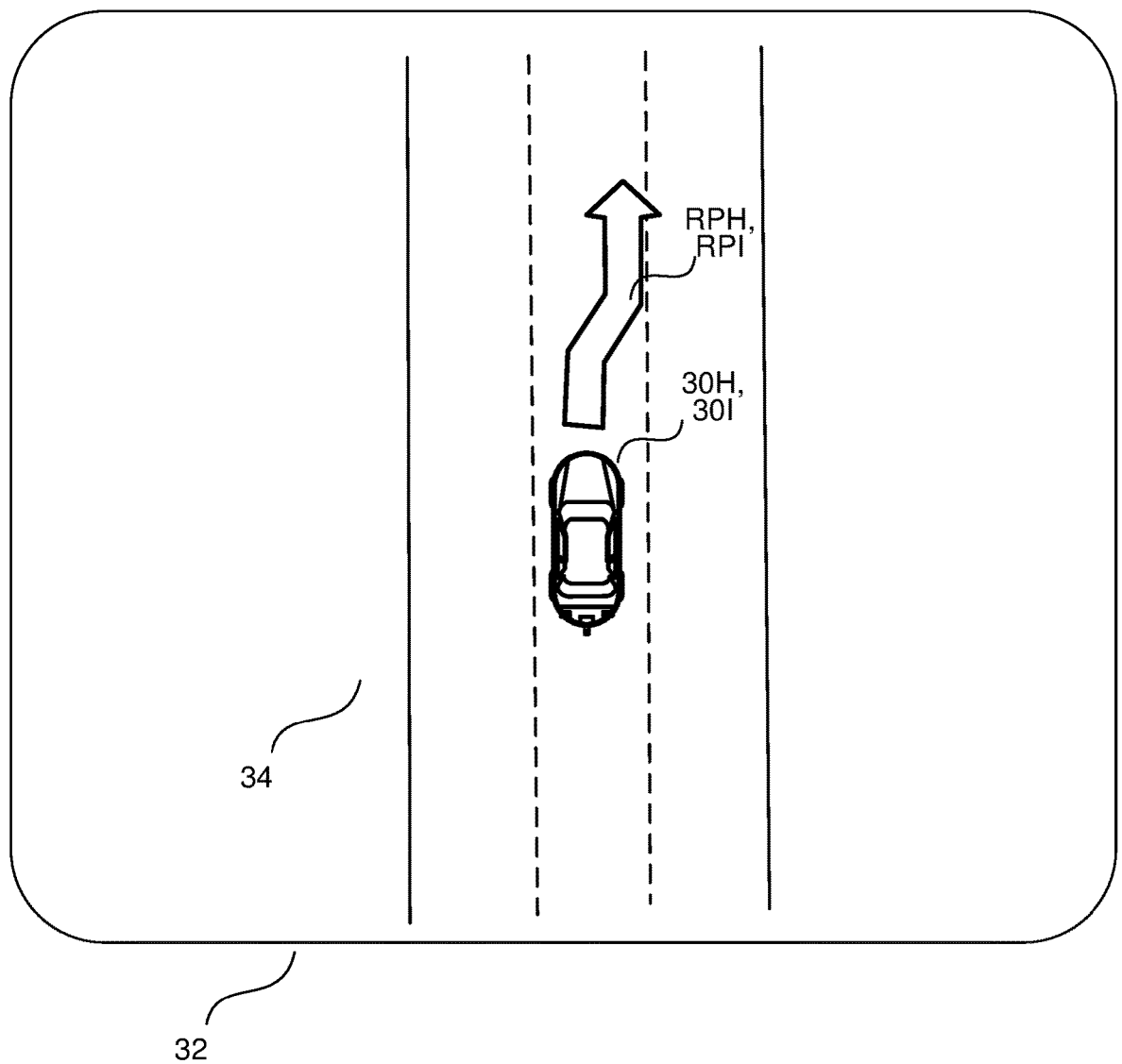
FIG. 14 illustrates the display of the recommended path determined by the vehicle safety system of each of two vehicles, in response to the third traffic scenario of FIG. 5.

With respect to the third traffic event of FIGS. 5 and 9, vehicle safety system 10 of vehicle 30H may display on touchscreen 32 an image(s) 34 including depictions of roadway R, vehicle 30H and recommended path RPH, as shown in FIG. 14. The vehicle safety system 10 of vehicle 30I may display on its touchscreen 32 an image(s) 34 including depictions of roadway R, vehicle 30I and recommended path RPI, also shown in FIG. 14.

In depicting the recommended paths by human interface 24 in FIGS. 10-14, only the vehicle in which vehicle safety system 10 is installed is displayed on touchscreen display 32. It is understood that, alternatively, more vehicles in the communication range of host vehicle 30 may be displayed to the vehicle driver, including the emergency vehicle, parked vehicle or motorcycle. For example, the entire image of FIGS. 7-9 may be displayed to the vehicle driver on touchscreen display 32.

In addition to visually displaying the recommended path as described above, vehicle safety system 10 may provide additional information to the driver of vehicle 30. For example, human interface 24 may indicate to the vehicle driver of the need to change the speed of vehicle 30 when following the recommended path. This may be done by changing the appearance of the recommended path in the graphical display on touchscreen display 32. The color of the recommended path may be a first color, such as green, to indicate that the vehicle speed should increase; a second color, such as yellow, to indicate that the vehicle speed does not need to change; and a third color, such as red, to indicate that the vehicle speed should decrease. In another embodiment, the recommended path remains the same color when displayed but varies in intensity depending up whether the vehicle speed should increase (increased intensity) or decrease (decreased intensity). In other embodiments, the depiction of the recommended path may alternate between different colors, the frequency of such alternating indicating whether vehicle speed should increase or decrease. It is understood that indicating a recommended vehicle speed or speed change may be represented, graphically or otherwise, in any of a number of ways.

Because the recommended path determined by vehicle safety system 10 changes over time, the recommended path is temporarily displayed on touchscreen display 32. For example, with respect to the first and third traffic events discussed above, the recommended path may no longer be effective if emergency vehicle EV or motorcycle M exits roadway R. With respect to the second traffic event, the recommended path may no longer be effective once vehicle 30 passes parked vehicle PV. In each case, vehicle safety system 10 determines whether the determined recommended path is no longer effective at 76 (FIG. 6) and if so, temporarily displays to the driver that the recommended path is no longer necessary at 77, and shortly thereafter ceases displaying the recommended path at 78. In addition, if the recommended path remains effective and the driver of vehicle 30 causes vehicle 30 to complete the recommended path, vehicle safety system 10 also ceases displaying the recommended path at 78. If the recommended path remains effective (step 76) and is not taken by the vehicle driver, the operation returns to step 74 and the display of the recommended path continues.

The example embodiments described above are directed to vehicles that are driven by humans. It is understood that the example embodiments may also be used in autonomous vehicles. In this case, the operation of the example embodiments would largely follow the flowchart of FIG. 6, with the exception that steps 74-78 would not be utilized. Instead, a new step would follow step 70 or 72 in which the autonomous vehicle would follow the recommended path determined in step 70. In other words, an autonomous vehicle would automatically follow the recommended path once the path is determined in step 70.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A method of providing guidance in a host vehicle, comprising:
   receiving a first broadcast signal transmitted by a first vehicle;
   extracting vehicle data, a vehicle identifier, and a request from the first broadcast signal;
   responsive to the request, determining a recommended path for the host vehicle based upon the extracted vehicle data; and
   displaying or causing the displaying of the recommended path to the driver of the host vehicle,
   wherein the host vehicle is traveling in a lane along a roadway, the first vehicle is a motorcycle traveling in the lane and the recommended path comprises moving along one side of the lane to allow the motorcycle to pass the host vehicle while in the other side of the lane,
   receiving a second broadcast signal transmitted by a second vehicle;
   extracting second vehicle data, a second vehicle identifier, and a second request from the second broadcast signal;
   responsive to the second request, determining a second recommended path for the host vehicle based upon the second extracted vehicle data from the second broadcast signal;
   determining whether the vehicle identifier of the second vehicle corresponds to the second request, and determining the second recommended path is responsive to an affirmative determination that the vehicle identifier of the second vehicle corresponds to the second request; and
   displaying or causing the displaying of the second recommended path to the driver of the host vehicle, wherein the second vehicle identifier is an identifier for a disabled vehicle.

2. The method of claim 1, wherein determining the recommended path is also based upon vehicle data of the host vehicle.

3. The method of claim 1, further comprising maintaining vehicle data of other vehicles that are within a communication range of the host vehicle, wherein determining the recommended path is also based upon the vehicle data of the other vehicles within the communication range of the host vehicle.

4. The method of claim 1, wherein the vehicle identifier is an identifier for at least one of an emergency medical services vehicle and a law enforcement vehicle.

5. The method of claim 1, further comprising determining that the recommended path is no longer effective and in response ceasing or causing the ceasing of the displaying of the recommended path to the driver of the host vehicle.

6. The method of claim 1, further comprising broadcasting the recommended path to vehicles that are within a communication range of the host vehicle.

7. The method of claim 1, further comprising determining whether the determined recommended path is different from a current path of the host vehicle, wherein displaying or causing the displaying of the recommended path is responsive to an affirmative determination that the determined recommended path is different from a current path of the host vehicle, and further comprising refraining from displaying or causing the display of the recommended path upon the determination that the recommended path is not different from the current path.

8. A program code product for guiding a host vehicle, the program code product stored in non-transitory memory and including instructions which, when executed by a processor, cause the processor to:
   receive a first broadcast signal transmitted by a first vehicle;
   extract vehicle data, a vehicle identifier, and a request from the first broadcast signal;
   responsive to the request, determine a recommended path for the host vehicle based upon the extracted vehicle data; and
   cause the recommended path to be displayed to the driver of the host vehicle;
   wherein the host vehicle is traveling in a lane along a roadway, the first vehicle is a motorcycle traveling in the lane and the recommended path comprises moving along one lateral side of the lane to allow the motorcycle to pass the host vehicle while in the other lateral side of the lane;
   further comprising instructions which, when executed by a processor, cause the processor to:
     receive a second broadcast signal transmitted by a second vehicle;
     extract second vehicle data, a second vehicle identifier, and a second request from the second broadcast signal;
     responsive to the second request, determine a second recommended path for the host vehicle based upon the second extracted vehicle data;
     determine whether the vehicle identifier of the second vehicle corresponds to the second request, and determining the second recommended path is responsive to an affirmative determination that the vehicle identifier of the second vehicle corresponds to the second request; and
     cause the second recommended path to be displayed to the driver of the host vehicle, wherein the second vehicle identifier is an identifier for a disabled vehicle.

9. The program code product of claim 8, further comprising instructions for maintaining vehicle data of other vehicles that are in a communication range of the host vehicle, wherein the recommended path is determined based upon the maintained vehicle data of the other vehicles within the communication range of the host vehicle.

10. The program code product of claim 8, further comprising instructions for determining whether the vehicle identifier of the first vehicle corresponds to the request, and the instructions for determining the recommended path determines the recommended path based upon an affirmative determination that the vehicle identifier of the first vehicle corresponds to the request.

11. The program code product of claim 8, further comprising instructions for determining whether the recommended path is no longer effective, and in response ceasing or causing the ceasing of the displaying of the recommended path to the driver of the host vehicle.

12. The program code product of claim 8, further comprising instructions for broadcasting the recommended path to vehicles that are within a communication range of the host vehicle.

13. A vehicle guidance system configured for use in a host vehicle, comprising:
   a transceiver having a transmitter and a receiver for receiving vehicle signals;
   a processor and memory coupled to the processor, the processor communicatively coupled to the transceiver, and the memory having stored therein a software program having instructions which, when executed by the processor, configure the processor to:
     receive from the receiver broadcast signal information contained in a broadcast signal from a first vehicle;
     extract vehicle data, a vehicle identifier, and a request from the broadcast signal information;
     responsive to the request, determine a recommended path for the host vehicle based upon the extracted vehicle data; and
     cause the recommended path to be displayed to a driver of the host vehicle,
     wherein the host vehicle is traveling in a lane along a roadway, the first vehicle is a motorcycle traveling in the lane and the recommended path comprises moving along one lateral side of the lane to allow the motorcycle to pass the host vehicle while in the other lateral side of the lane;
   wherein the software program further includes instructions which, when executed by the processor, configure the processor to:
     receive from the receiver second broadcast signal information contained in a second broadcast signal from a second vehicle;
     extract second vehicle data, a second vehicle identifier, and a second request from the second broadcast signal information;
     responsive to the second request, determine a second recommended path for the host vehicle based upon the second extracted vehicle data;
     cause the second recommended path to be displayed to a driver of the host vehicle; and
     determine whether the second vehicle identifier of the second vehicle corresponds to the second request, wherein the instructions for determining the second recommended path determines the second recommended path based upon an affirmative determination that the second vehicle identifier of the second vehicle corresponds to the second request, and wherein the second vehicle identifier is an identifier for a disabled vehicle.

14. The vehicle guidance system of claim 13, wherein the processor is configured to determine the recommended path for the host vehicle based upon data corresponding to other vehicles that are within a communication range of the host vehicle.

15. The vehicle guidance system of claim 13, wherein the processor is further configured to confirm that the request is of a type that is allowed to be made by the first vehicle, and the recommended path is determined by the processor only upon an affirmative confirmation.

16. The vehicle guidance system of claim 13, wherein the host vehicle is traveling in the lane along the roadway, the first vehicle is a motorcycle traveling in the lane and the recommended path corresponds to the movement to the lateral side of the lane to allow the motorcycle to pass the host vehicle while in a second lateral side of the lane.

17. The vehicle guidance system of claim 13, wherein the instructions, when executed by the processor, configure the processor to determine whether the recommended path is different from a current path of the host vehicle, the instructions for causing the displaying of the recommended path is based in part upon the determination that the recommended path is different from the current path, and the instructions, when executed by the processor, configure the processor to refrain from displaying the recommended path responsive to the determination that the recommended path is not different from the current path.

18. The program code product of claim 8, further including instructions which, when executed by the processor, causes the processor to determine whether the recommended path is different from a current path of the host vehicle, the instructions for causing the displaying of the recommended path is based in part upon the determination that the recommended path is different from the current path, the instructions further comprise instructions for refraining from displaying the recommended path upon the determination that the recommended path is not different from the current path.

19. The program code product of claim 8, wherein the host vehicle is traveling in the lane of the roadway, the first vehicle is a motorcycle traveling in the lane and the recommended path corresponds to the movement to the lateral side of the lane to allow the motorcycle to pass the host vehicle while in a second lateral side of the lane.

20. The method of claim 1, wherein the second vehicle is a disabled vehicle.

21. The program code product of claim 8, wherein the second vehicle is a disabled vehicle.

* * * * *